(12) United States Patent
Shimizu

(10) Patent No.: US 8,116,306 B2
(45) Date of Patent: Feb. 14, 2012

(54) SHARED MEMORY SYSTEM

(75) Inventor: Takeshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 12/556,164

(22) Filed: Sep. 9, 2009

(65) Prior Publication Data
US 2010/0061376 A1    Mar. 11, 2010

(30) Foreign Application Priority Data

Sep. 11, 2008   (JP) ................................. 2008-233949

(51) Int. Cl.
*H04L 12/54* (2006.01)
*G06F 12/02* (2006.01)

(52) U.S. Cl. ............ 370/381; 370/428; 709/214; 711/5; 711/149

(58) Field of Classification Search .................. None
See application file for complete search history.

(56) References Cited

U.S. PATENT DOCUMENTS

| | | | |
|---|---|---|---|
| 6,745,277 B1 * | 6/2004 | Lee et al. ........................ | 711/5 |
| 7,248,596 B2 | 7/2007 | Shimizu | |
| 7,634,622 B1 * | 12/2009 | Musoll et al. .................. | 711/151 |
| 7,903,659 B2 * | 3/2011 | Sindhu et al. .................. | 370/392 |
| 2004/0156358 A1 * | 8/2004 | Nakagawa et al. ............ | 370/360 |
| 2006/0221945 A1 * | 10/2006 | Chin et al. ..................... | 370/381 |
| 2008/0013561 A1 * | 1/2008 | Shimizu ........................ | 370/413 |

FOREIGN PATENT DOCUMENTS

JP        2004-240980        8/2004

* cited by examiner

*Primary Examiner* — Robert Scheibel
*Assistant Examiner* — Duc Duong
(74) *Attorney, Agent, or Firm* — Staas & Halsey LLP

(57) ABSTRACT

A shared memory system including: a shared memory includes a plurality of memory banks; a plurality of input ports; a plurality of input buffers; and a controller for controlling writing-into and reading out of the shared memory and for transferring data from each of the input buffers to the shared memory, wherein when one of the memory banks is cycled back next to the starting memory bank, another memory block is to be selected next for writing the remainder of a series of data, said controller controlling each of the input buffers to transfer a plurality of series of data to the shared memory successively with a time gap while switching to said another memory block, said controller offsetting a start memory bank in said another block for start writing the remainder of the series of data by an amount of memory banks corresponding to the time gap.

4 Claims, 8 Drawing Sheets

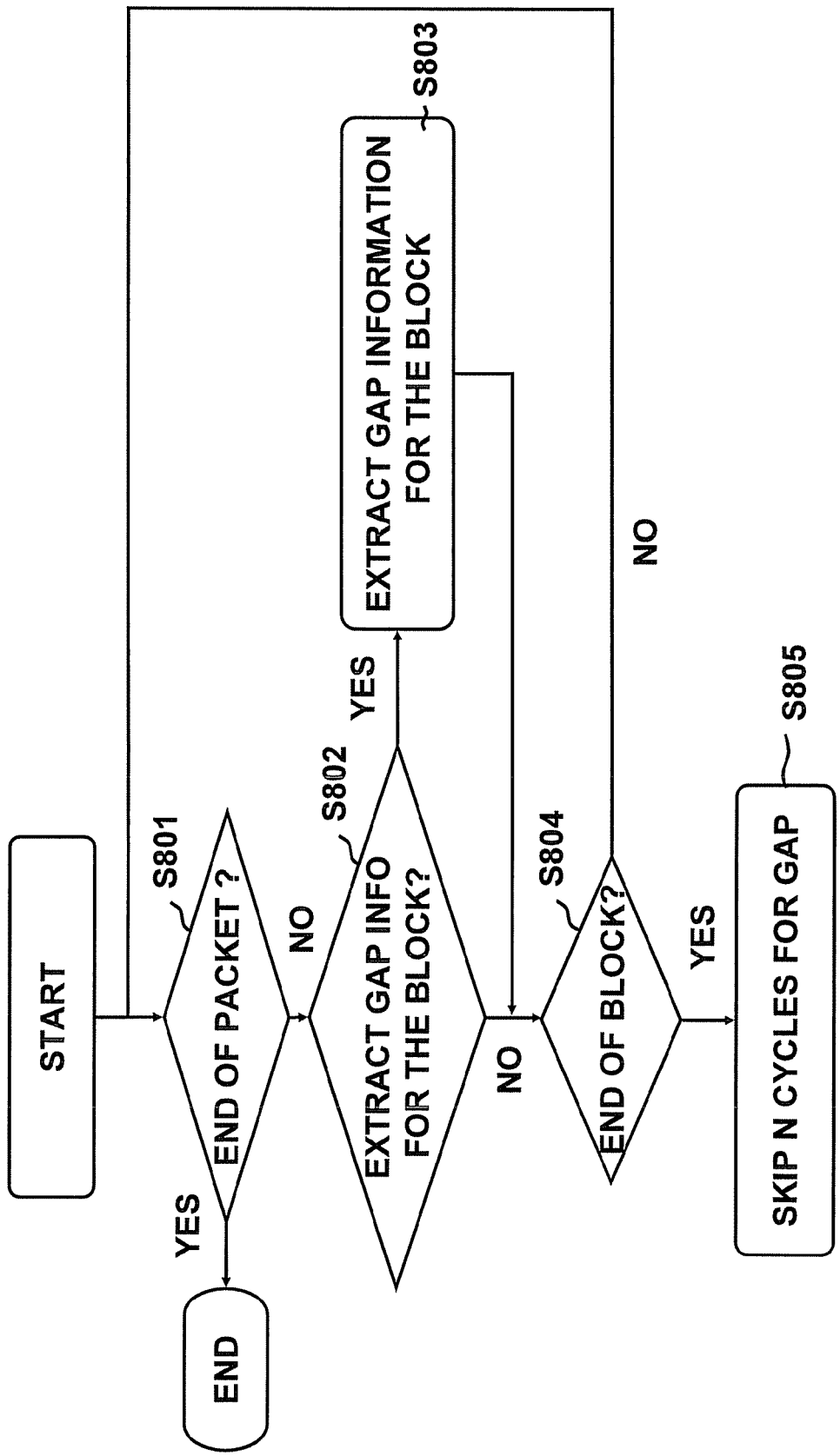

SHARED MEMORY SYSTEM

CROSS-REFERENCE TO RELATED APPLICATION

This application is based upon and claims the benefit of priority of the prior Japanese Patent Application No. 2008-233949, filed on Sep. 11, 2008, the entire contents of which are incorporated herein by reference.

FIELD

A certain aspect of the embodiments discussed herein is related to a technique for storing packets in a switch.

BACKGROUND

Switches are devices that establish connections between networks and perform packet switching in communication systems. A switch that relays communications of a plurality of information processing devices exists. Such a switch includes multiple ports so that the switch can connect to a plurality of information processing devices. A switch (hereinafter called a multiport switch) that includes multiple ports receives packets from a plurality of information processing devices and transmits packets to a plurality of information processing devices. In such a multiport switch, multiple ports share a memory. The reason for this is to, when a multiport switch performs what is called multicast transmission in which the same packet is transmitted to a plurality of information processing devices, prevent the multiport switch from making copies of a packet in response to the number of information processing devices to which the packet is transmitted. In a multiport switch, the processing speed of packet switching can be improved by using memory interleaving for the shared memory.

In a case where a multiport switch stores transfer data (a packet) in a shared memory, using memory interleaving, unless the input and output throughput of each port is set to be the same as the input and output throughput of a memory per port, a problem such as a decrease in the efficiency of storing operations on a shared memory occurs. That is, when the switch stores, in the shared memory, a gap occurs due to the difference in input and output speed between the ports and the shared memory. For example, when the data rate supplied from a port is smaller than the data rate consumed by the shared memory per port, padding data needs to be inserted in the shared memory, in order to match the both data rates. In such cases, even though the latency (delay time) can be shortened by interleaving, the efficiency of storing operations on the memory decreases by the padding data. Thus, in a multiport switch, in order to implement cut through processing in which transfer data is efficiently stored in a shared memory, using memory interleaving, and the latency (delay time) is short, the input and output throughput of each port needs to be set to match the input and output throughput of the shared memory per port, or the ratio between the input and output throughputs needs to be set to be an integral multiple.

However, in a multiport switch, setting the input and output throughput of each port to match the input and output throughput of a shared memory per port, or setting the ratio between the input and output throughputs to be an integral multiple significantly limits the variation of the configuration of the switch. For example, when the number of ports in a switch is increased, the total input and output throughput of the ports in the switch increases accordingly. To keep the efficiency of storing operations on a shared memory, the input and output throughput of the shared memory per port needs to be increased to an integral multiple of the input and output throughput of a port. Thus, in a multiport switch, it is desired that, without setting the input and output throughput of each port to match the input and output throughput of a shared memory per port or setting the ratio between the input and output throughputs to be an integral multiple, the efficiency of storing operations on the memory is not decreased by avoiding padding data being stored in the shared memory, and the latency is shortened.

Japanese Laid-open Patent Publication No. 2004-240980 discloses techniques for using shared memories in switches that perform packet switching.

SUMMARY

According to an aspect of an embodiment, a shared memory system including: a shared memory including a plurality of memory banks for storing data, each of the memory banks including a plurality of divided portions of memory blocks, the memory blocks including a set of divided portions across the memory banks; a plurality of input ports for transferring a plurality of streams of data from an exterior of the shared memory system, respectively; a plurality of input buffers for receiving the plurality of the streams of data transferred from the plurality of the input ports, respectively; and a controller for controlling writing-into and reading out of the shared memory and for transferring data from each of the input buffers to the shared memory, said controller writing a series of data received from each of the input buffers into the memory banks around word by word sequentially and cyclically in one of the memory blocks from one of the memory banks designated as a starting memory bank toward the end of the series of data, wherein when selected one of the memory banks for writing one of the words in the series of data is cycled back next to the starting memory bank, another memory block is to be selected next for writing the remainder of the series of data, said controller controlling each of the input buffers to transfer a plurality of series of data to the shared memory successively with a time gap while switching to said another memory block, said controller offsetting a start memory bank in said another block for start writing the remainder of the series of data by an amount of memory banks corresponding to the time gap.

The object and advantages of the invention will be realized and attained by means of the elements and combinations particularly pointed out in the claims.

It is to be understood that both the forgoing general description and the following detailed description are exemplary and explanatory and are not respective of the invention, as claimed.

BRIEF DESCRIPTION OF DRAWINGS

FIG. 8 is a flowchart concerning gap management according to the embodiment when data is read.

DESCRIPTION OF EMBODIMENTS

[1. Outline of Switch 100]

In this embodiment, a shared memory system will be described, taking operations of storing packet data in a memory in a switch 100 as an example.

The switch 100 according to the embodiment is a device that establishes connections between networks and relays packets communicated between networks. More specifically, the switch 100 is, for example, an Ethernet (registered trademark) switch, a PCI-express switch, a fiber channel switch, a SATA/SAS switch, or a USB switch. The switch 100 is a switch that is useful especially when used as a core switch that connects networks and is required to relay a large amount of data.

The switch 100 includes a plurality of input and output ports, input ports 101 to 106 and output ports 120 to 125, so that a plurality of information processing devices (for example, personal computers and servers) can be connected to the switch 100. The switch 100 includes a shared memory 113 shared by the input ports 101 to 106 and the output ports 120 to 125.

Moreover, the switch 100 is a switch the purpose of which is to efficiently use the shared memory 113 and perform data transfer at high speed. The switch 100 is a switch that improves the efficiency of storing operations on the shared memory 113 and implements high-speed data transfer even without setting the input and output throughput of each of the input ports 101 to 106 and the output ports 120 to 125 to match the input and output throughput of the shared memory 113 per port or setting the ratio between the input and output throughputs to be an integral multiple. Throughput represents processing capacity per unit time. Specifically, throughput is, for example, the effective transfer amount and transfer rate of packet data of the input ports 101 to 106, the output ports 120 to 125, and the shared memory 113 of the switch 100 per unit time.

Specific operation of the switch 100 will now be described.

[2. Switch 100]

Figure 1:
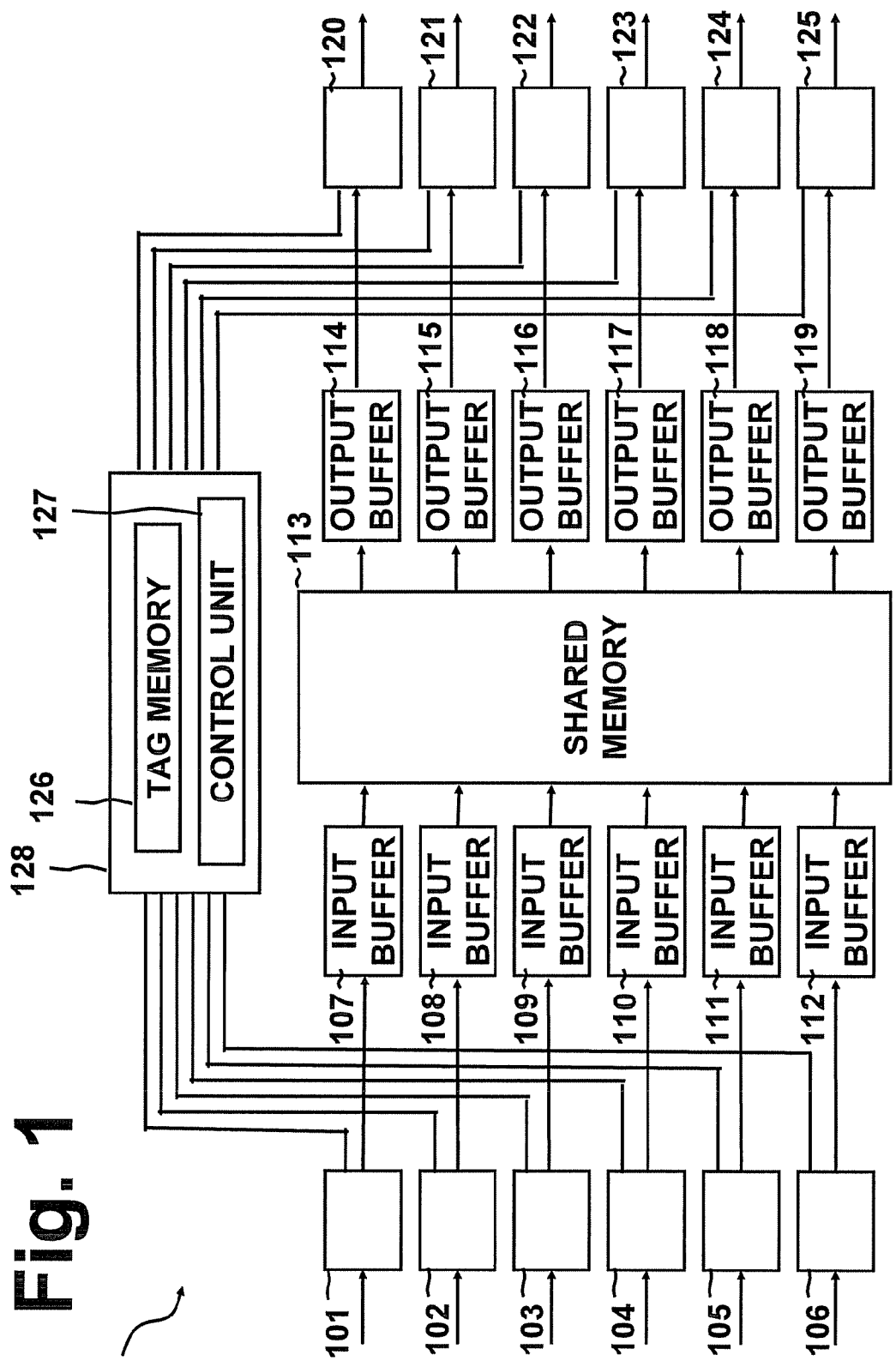
FIG. 1 is a block diagram of a switch 100 according to an embodiment.
Figure 3:
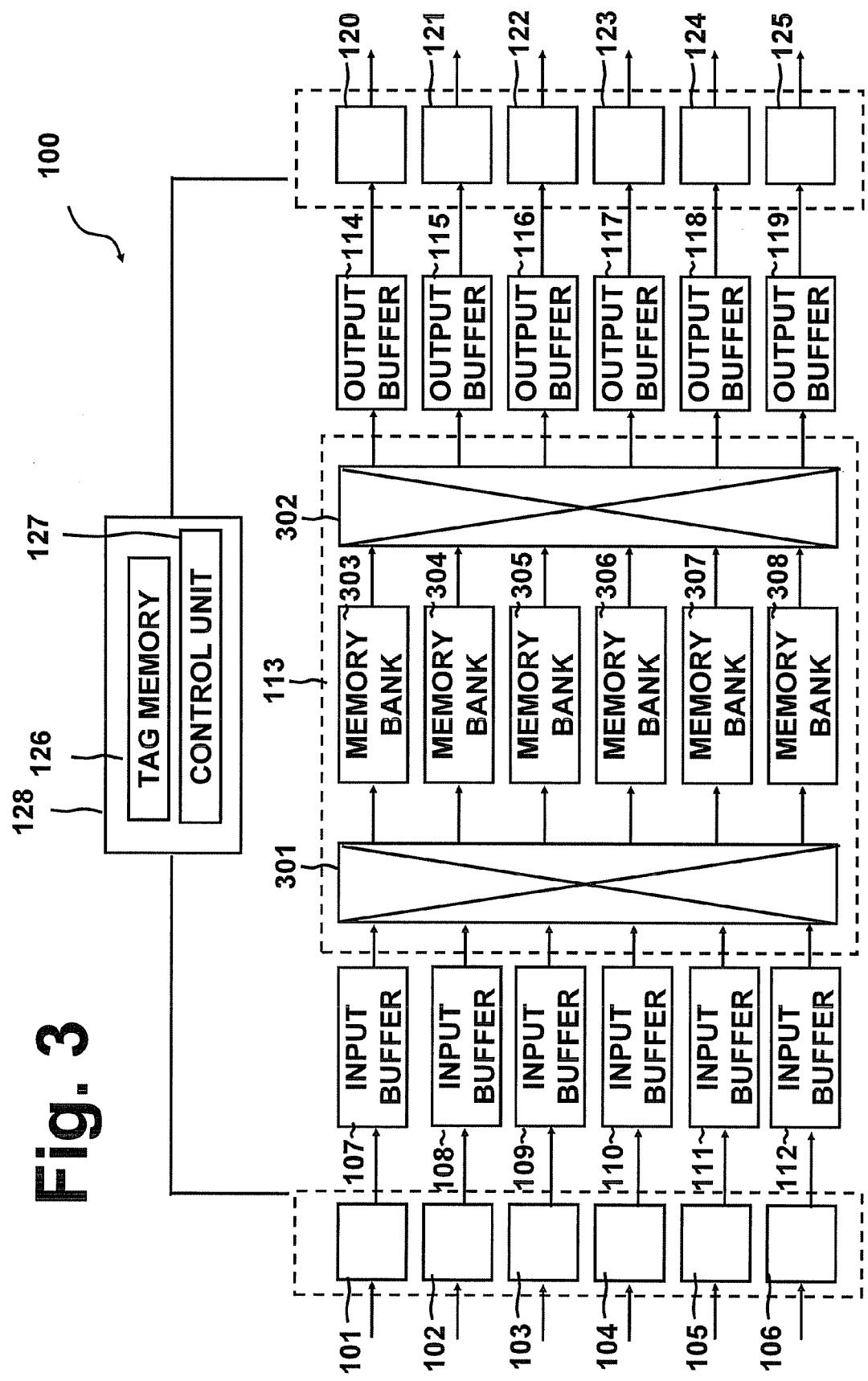
FIG. 3 is a more specific block diagram of the switch 100 according to the embodiment.

FIG. 1 is a block diagram of the switch 100 according to the embodiment. The switch 100 includes the input ports 101 to 106, input buffers 107 to 112, the shared memory 113, output buffers 114 to 119, the output ports 120 to 125, a TAG memory 126, and a control unit 127. Moreover, FIG. 3 is a block diagram showing the details of the shared memory of the switch 100. The shared memory 113 includes switching units 301 and 302 and memory banks 303 to 308, as shown in FIG. 3. In FIG. 3, the connection relationships between a control mechanism 128 (the TAG memory 126 and the control unit 127) and the input ports 101 to 106 and the output ports 120 to 125 are described schematically. The connection relationships between the control mechanism 128 and the input ports 101 to 106 and the output ports 120 to 125 are those shown in FIG. 1.

The switch 100 stores packet data input from information processing devices connected to the switch 100 to the input ports 101 to 106 in the shared memory 113 via the input buffers 107 to 112. The switch 100 reads the packet data stored in the shared memory 113 and transmits the packet data to information processing devices connected to the switch 100 from the output ports 120 to 125 via the output buffers 114 to 119.

The switch 100 relays the packet data by the cut through method in which, after a part of the packet data is stored in the shared memory 113, the part of the packet data is read from the shared memory 113 to transfer the packet data to an intended information processing device. In this case, the switch 100 need not store the whole packet data in the shared memory 113 to transfer the packet data to the intended information processing device by what is called the store and forward method. Moreover, in the switch 100, it is intended to reduce the latency by storing packet data in the installed shared memory 113, using the interleaving method. Cut through represents a method in which, before the end of packet data is stored in the shared memory 113, the relay of the packet data is started. Store and forward represents storing and forwarding of the whole packet data. That is, store and forward is a method in which, after the switch 100 stores the whole packet data received from transmitting information processing devices in the shared memory 113 once and performs, for example, filtering of a CRC error of the packet data and colliding packets, the switch 100 transfers the packet data to receiving information processing devices from the output ports 120 to 125. Moreover, the interleaving method represents one of the techniques for improving the speed of data transfer in a memory. The interleaving method is a method for reading and writing data from and to a plurality of memory banks in parallel. Thus, the speed of reading and writing data from and to a memory can be improved.

In the embodiment, the shared memory 113 includes the plurality of memory banks 303 to 308, as shown in FIG. 3. Contiguous addresses in words are assigned to the plurality of memory banks 303 to 308. That is, contiguous addresses are assigned to the memory banks 303 to 308 in sequence.

The operation of each unit in the switch 100 will next be described.

[2.1. Control Unit 127]

The control unit 127 first performs control to store packet data input to the input ports 101 to 106 in the shared memory 113 via the input buffers 107 to 112. The control unit 127 further reads packet data from the shared memory 113 via the output buffers 114 to 119 and transfers the packet data to receiving information processing devices from the output ports 120 to 125. The control unit 127 writes packet data to the shared memory 113 and reads packet data from the shared memory 113, specifying addresses indicating the memory banks 303 to 308 and addresses in the memory banks 303 to 308. In the embodiment, the length of packet data handled by the switch 100 is variable. That is, the size of packet data is not constant and varies with the amount and type of data transmitted and received by an information processing device.

In the embodiment, the switch 100 stores packets in the shared memory 113 by the interleaving method. The control unit 127 divides packet data into segments of predetermined size (word size). Then, the control unit 127 stores the divided packet data in the shared memory 113 via the input buffers 107 to 112. The control unit 127 reconstructs the packet data divided and stored in the shared memory 113 and transmits the packet data from the output ports 120 to 125 via the output buffers 114 to 119.

Moreover, the control unit 127 is a unit that controls forwarding and filtering in the switch 100 and controls the traffic of networks. Forwarding represents an operation of transferring packet data received by the switch 100 at the input ports 101 to 106 to networks (intended information processing devices) from the output ports 120 to 125. Filtering represents an operation of discarding packet data received by the switch 100 according to predetermined rules. The switch 100 controls the traffic in networks by the control operations of forwarding and filtering by the control unit 127.

In an embodiment in the form of an Ethernet (registered trademark) switch, the control unit 127 determines the destination of packet data on the basis of the MAC address of the packet data. Specifically, the control unit 127 records the correspondence between the source MAC address of a received packet and a receiving port. The control unit 127 transmits packet data from a port corresponding to the destination MAC address of the received packet. When the control unit 127 determines that the port corresponding to the destination MAC address of the received packet is the port, at which the received packet has been received, the control unit 127 discards the received packet.

Moreover, when the control unit 127 determines that no port corresponding to the destination MAC address of the received packet exists or when the received packet is multicasted or broadcasted, the control unit 127 transmits the packet from all the ports other than the port, at which the received packet has been received. Moreover, the control unit 127 has a function of performing overall control of the switch 100 by performing initial setting of the switch 100 and resetting of the switch 100.

[2.2. Input Buffers 107 to 112, Output Buffers 114 to 119]

The input buffers 107 to 112 adjust (absorb) the rate at which packet data is transferred in the input ports 101 to 106 (the speed of writing to the input buffers 107 to 112) and the speed of writing from the input buffers 107 to 112 to the shared memory 113. The input buffers 107 to 112 store packet data in data units (in units of blocks 201 to 206 described below) written by the control unit 127 from the input buffers 107 to 112 to the shared memory 113.

The output buffers 114 to 119 adjust (absorb) the speed of writing from the output buffers 114 to 119 to the output ports 120 to 125 and the speed of writing from the shared memory 113 to the output buffers 114 to 119. The output buffers 114 to 119 store packet data in data units (in units of the blocks 201 to 206 described below) read by the control unit 127 from the output buffers 114 to 119 and the shared memory 113.

[2.3. Shared Memory 113]

The shared memory 113 will next be described. FIG. 3 is the block diagram showing a specific configuration of the shared memory 113. The shared memory 113 according to the embodiment includes the switching units 301 and 302 and the memory banks 303 to 308.

The switch 100 according to the embodiment stores, by the interleaving method, data received at the input ports (Input Port) in the shared memory and outputs packets to the outside of the switch 100 from the output ports (Output Port).

The switching unit 301 is a unit that performs assignment to determine which of the memory banks 303 to 308 packet data input from the input ports 101 to 106 is stored. In the embodiment, since the control unit 127 stores packet data in the shared memory 113 by the interleaving method, the packet data is divided into segments of predetermined size (word size). Then, the control unit 127 transfers the divided packet data from the input ports 101 to 106 to the input buffers 107 to 112. Then, the switching unit 301 stores the divided packet data in the memory banks 303 to 308, sequentially assigning the packet data in units of words to the memory banks 303 to 308. The switching unit 302 reads the divided packet data stored in the memory banks 303 to 308 to transfer the divided packet data to the output buffers 114 to 119. Then, the control unit 127 outputs the packet data from an output port for performing transmission to an information processing device that is the destination of the packet data, out of the output ports 120 to 125. The control unit 127 of the switch 100 controls the switching units 301 and 302 to write packet data to the memory banks 303 to 308 by the interleaving method and read packet data from the memory banks 303 to 308, as described above.

[2.4. TAG Memory 126]

The TAG memory 126 is a memory that stores gap information. The switch 100 according to the embodiment is a switch in which the input and output throughput of the shared memory 113 per port is larger than the input and output throughput of each of the input ports 101 to 106 and the output ports 120 to 125. The switch 100 stores, in the TAG memory 126, information on a gap that occurs due to the difference in the input and output throughputs (gap information) between ports and the shared memory.

[3. Mode for Storing Data]

Figure 2:
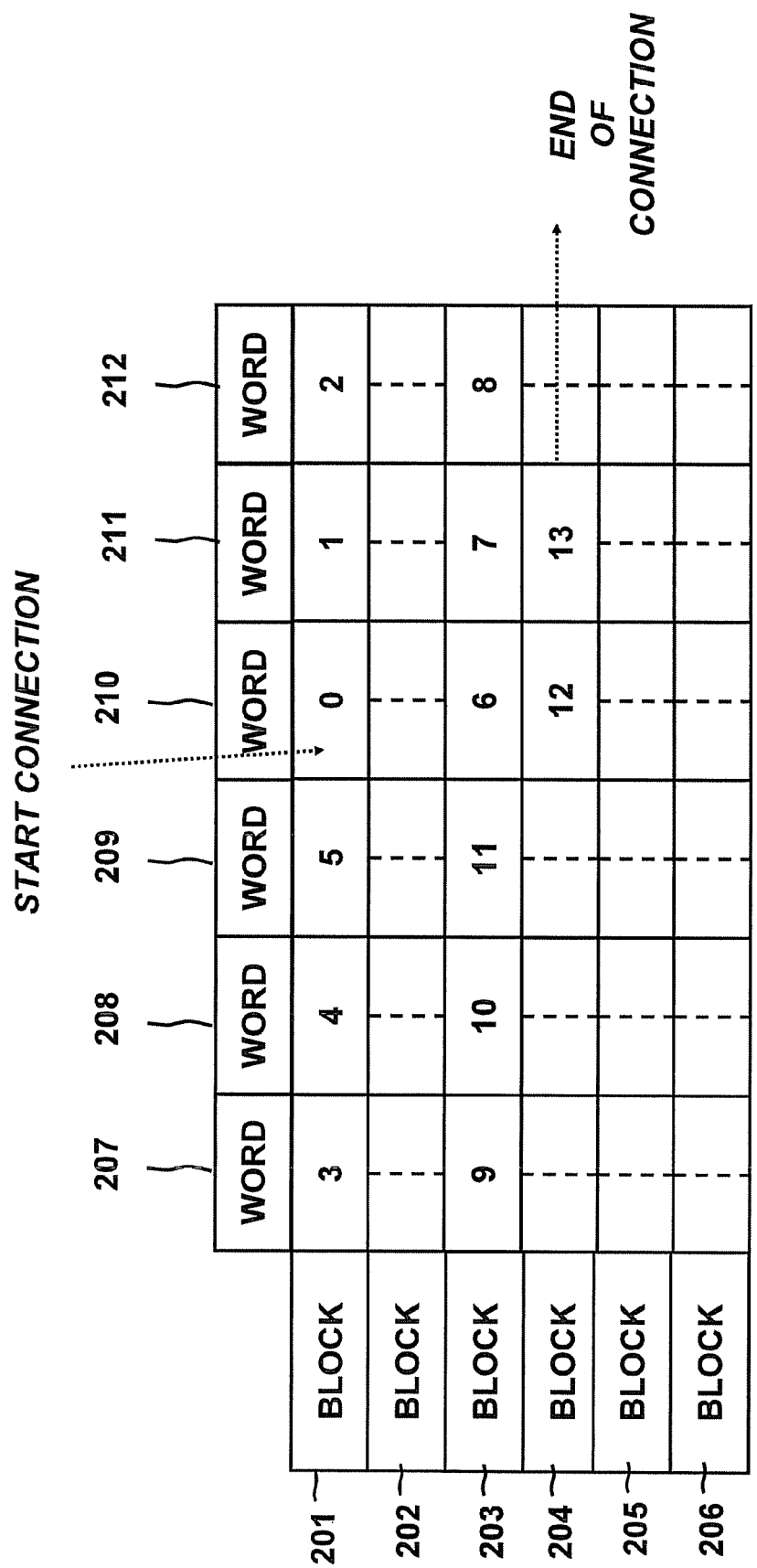
FIG. 2 is a schematic diagram concerning access to stream data in the switch 100 according to the embodiment.
Figure 4:
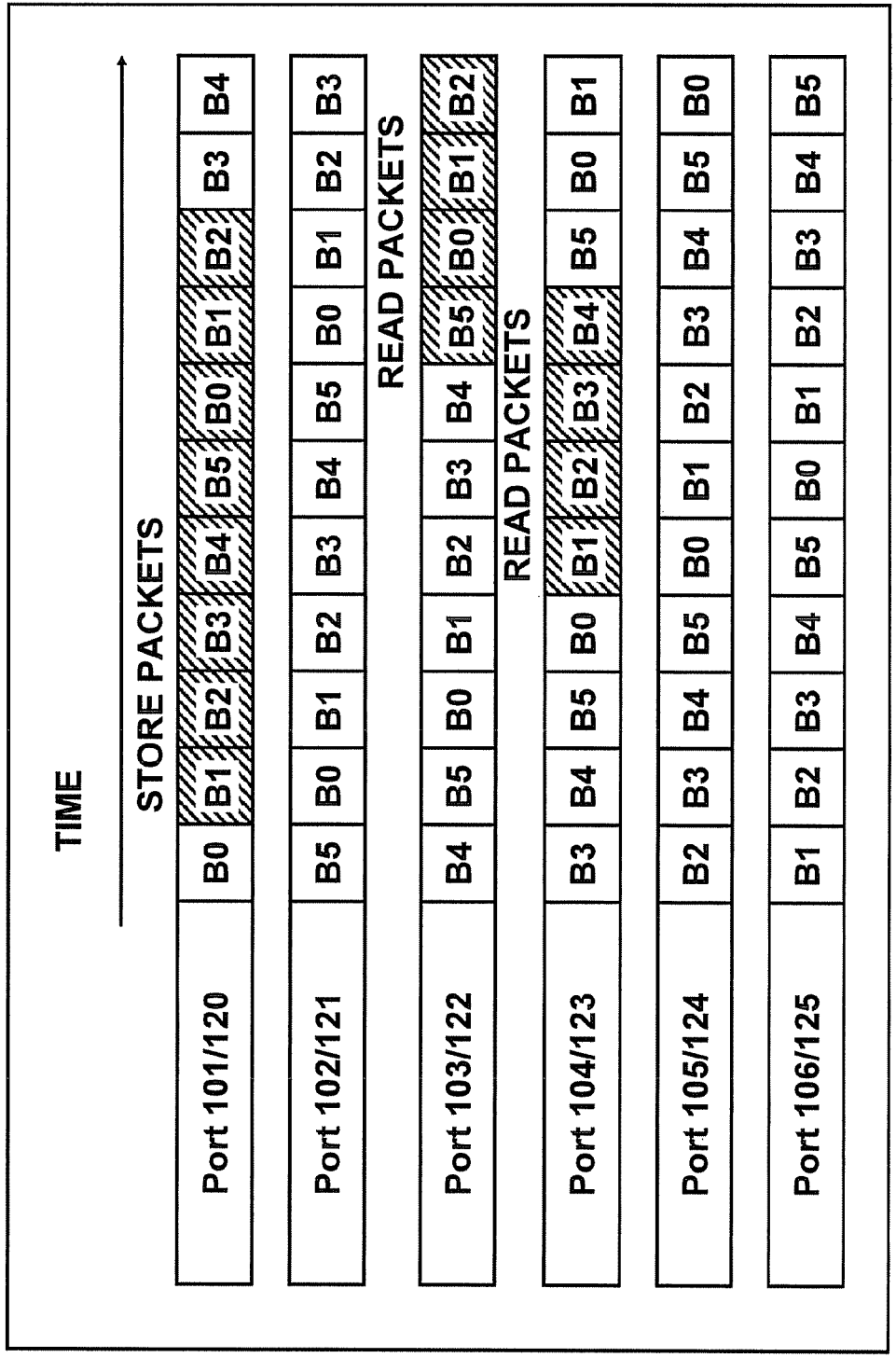
FIG. 4 is a schematic diagram showing switch scheduling in the switch 100 according to the embodiment.
Figure 5:
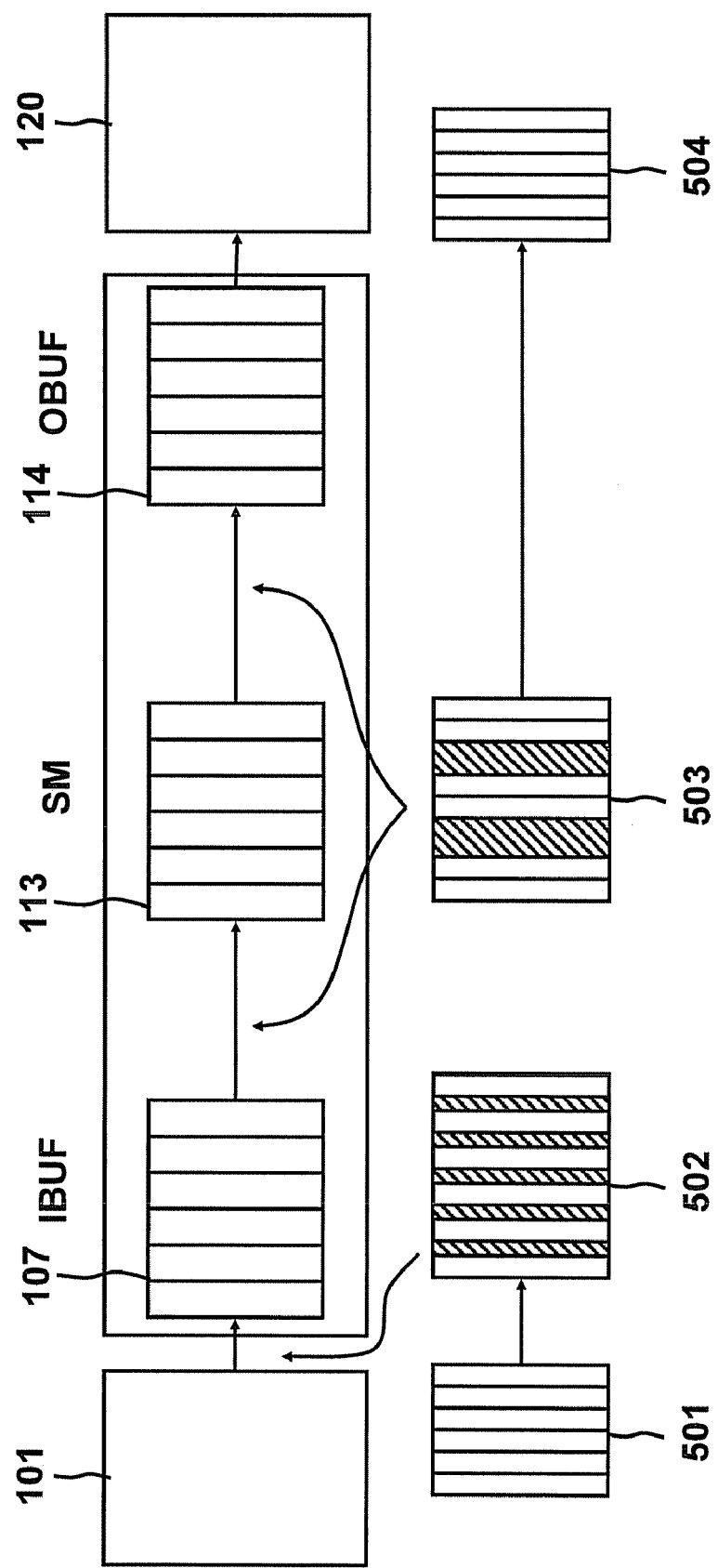
FIG. 5 is a schematic diagram showing packet transfer by the switch according to the embodiment.
Figure 6:
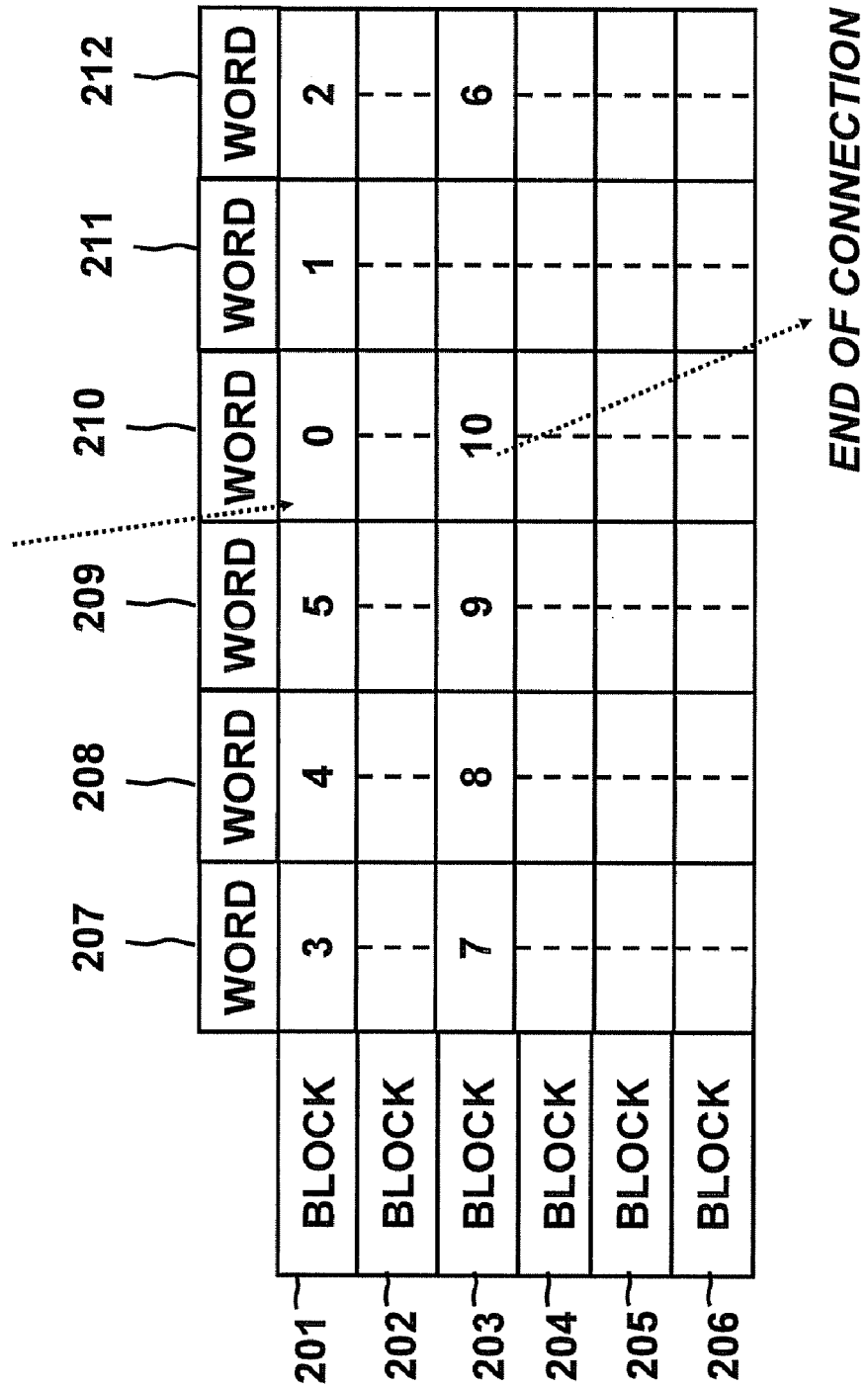
FIG. 6 is a schematic diagram concerning access to stream data in the switch 100 according to the embodiment.

A mode in which the switch 100 stores data in the shared memory 113 will next be described. FIG. 2 is a schematic diagram concerning access to packet data in the switch 100 according to the embodiment. Moreover, FIG. 4 is a schematic diagram showing switch scheduling in the switch 100 according to the embodiment. FIG. 5 is a schematic diagram showing packet transfer by the switch according to the embodiment. FIG. 6 is a schematic diagram concerning access to stream data in the switch 100 according to the embodiment.

[3.1. Management of Gap Information]

FIG. 2 is the schematic diagram showing storing packet data in a case where the input and output throughput of each of the input ports 101 to 106 and the output ports 120 to 125 matches the input and output throughput of the shared memory 113 per port, and no gap occurs in the shared memory 113. FIG. 2 is the diagram showing the logical structure of the six memory banks 303 to 308 constituting the shared memory 113. A case where the input and output throughput of each of the input ports 101 to 106 and the output ports 120 to 125 does not match the input and output throughput of the shared memory 113 per port, i.e., a case where a gap occurs in the shared memory 113, will be described below, using FIG. 6.

The memory banks 303 to 308 are logically divided into the blocks 201 to 206. Each of the blocks 201 to 206 includes words 207 to 212. Each of the words 207 to 212 is a data storage area in the memory banks 303 to 308. That is, each of the blocks 201 to 206 includes data storage areas each of which is a part of the memory banks 303 to 308 that are physically separated. Memory addresses are contiguous in each of the blocks 201 to 206. That is, contiguous memory addresses are assigned across the memory banks 303 to 308.

An embodiment in which the switch 100 stores a piece of packet data in the memory banks 303 to 308 will be described for the sake of simplifying the description. Needless to say, the switch 100 is a multiport switch and a switch that can transfer a plurality of pieces of packet data input from the input ports 101 to 106 at the same time.

The control unit 127 divides a piece of packet data input from the input ports 101 to 106 into segments of word size (the size of each of the words 207 to 212). The control unit 127 generates fourteen divided segments of packet data of the word size. Then, the control unit 127 sequentially stores the fourteen divided segments of data of the word size in the memory banks 303 to 308. Numbers "0" to "13" described in a matrix represented by blocks (rows) and words (columns) described in FIG. 2 indicate the order in which the control unit 127 stores the fourteen divided segments of data in the shared memory 113. The control unit 127 stores the divided segments of data in positions (areas) of the numbers "0" to "10" described in the matrix.

For example, the control unit 127 starts to store one of the divided segments of data from the word 210 in the block 201 (the divided segment of data indicated by "0"). When the control unit 127 finishes storing data in all the words 207 to 212 constituting the block 201 (when the control unit 127 finishes storing one of the divided segments of data indicated by "5"), the control unit 127 stores one of the divided segments of data in the word 210 in the block 203. Then, the control unit 127 sequentially stores ones of the divided segments of data in the words 211, 212, 207, 208, and 209 in the block 203 (the control unit 127 stores the divided segments of data in the order of "6", "7", . . . "11"). The control unit 127 further stores ones of the divided segments of data in the words 210 and 211 in the block 204 to finish storing the piece of packet data (the control unit 127 stores the divided segments of data in the order of "12", "13" to finish storing the piece of packet data).

FIG. 4 is the schematic diagram showing switch scheduling in the switch 100 according to the embodiment.

In the schematic diagram shown in FIG. 4, B0, B1, B2, B3, B4, and B5 indicate access to the memory bank 303, access to the memory bank 304, access to the memory bank 305, access to the memory bank 306, access to the memory bank 307, and access to the memory bank 308, respectively. It is shown that divided segments of data input from the input port 101 are cyclically written to the memory banks 303, 304, . . . , the memory bank 308 in this order. Moreover, FIG. 4 shows that divided segments of data output from the output port 120 are cyclically read from the memory banks 303, 304, . . . , the memory bank 308 in this order.

Similarly, FIG. 4 shows that, when a divided segment of data input from the input port 101 has been written to the memory bank 303, a divided segment of data input from the input port 102 is written to the memory bank 308, and subsequently, divided segments of data input from the input port 102 are cyclically written to the memory banks 303, 304, . . . , the memory bank 307 in this order. Moreover, FIG. 4 shows that, when a divided segment of data output from the output port 120 has been read from the memory bank 303, a divided segment of data output from the output port 121 is read from the memory bank 308, and subsequently, divided segments of data output from the output port 121 are read from the memory banks 303, 304, . . . , the memory bank 307 in this order. Moreover, FIG. 4 shows that, when a divided segment of data input from the input port 101 has been written to the memory bank 303, a divided segment of data input from the input port 103 is written to the memory bank 307, and subsequently, divided segments of data input from the input port 103 are cyclically written to the memory banks 308, 303, . . . , the memory bank 306 in this order.

Moreover, FIG. 4 shows that, when a divided segment of data output from the output port 120 has been read from the memory bank 303, a divided segment of data output from the output port 122 is read from the memory bank 307, and subsequently, divided segments of data output from the output port 122 are read from the memory banks 308, 303, . . . , the memory bank 306 in this order. Moreover, FIG. 4 shows that, when a divided segment of data input from the input port 101 has been written to the memory bank 303, a divided segment of data input from the input port 104 is written to the memory bank 306, and subsequently, divided segments of data input from the input port 104 are cyclically written to the memory banks 307, 308, . . . , the memory bank 305 in this order.

Moreover, FIG. 4 shows that, when a divided segment of data output from the output port 120 has been read from the memory bank 303, a divided segment of data output from the output port 123 is read from the memory bank 306, and subsequently, divided segments of data output from the output port 123 are read from the memory banks 307, 308, . . . , the memory bank 305 in this order. Moreover, FIG. 4 shows that, when a divided segment of data input from the input port 101 has been written to the memory bank 303, a divided segment of data input from the input port 105 is written to the memory bank 305, and subsequently, divided segments of data input from the input port 105 are cyclically written to the memory banks 306, 307, . . . , the memory bank 304 in this order.

Moreover, FIG. 4 shows that, when a divided segment of data output from the output port 120 has been read from the memory bank 303, a divided segment of data output from the output port 124 is read from the memory bank 305, and subsequently, divided segments of data output from the output port 124 are read from the memory banks 306, 307, . . . , the memory bank 304 in this order. Moreover, FIG. 4 shows that, when a divided segment of data input from the input port 101 has been written to the memory bank 303, a divided segment of data input from the input port 106 is written to the memory bank 304, and subsequently, divided segments of data input from the input port 106 are cyclically written to the memory banks 305, 306, . . . , the memory bank 303 in this order. Moreover, FIG. 4 shows that, when a divided segment of data output from the output port 120 has been read from the memory bank 303, a divided segment of data output from the output port 125 is read from the memory bank 304, and subsequently, divided segments of data output from the output port 125 are read from the memory banks 305, 306, . . . , the memory bank 303 in this order.

For example, the control unit 127 stores divided segments of data from the input port 101 in the memory banks 304, 305, 306, 307, 308, 303, 304, and 305 in this order, as shown in FIG. 4. Then, when the control unit 127 has stored the divided segment of data from the input port 101 in the memory bank 307, the control unit 127 reads a divided segment of data from the memory bank 304 and outputs the divided segment of data from the output port 123. Moreover, when the control unit 127 has stored the divided segment of data from the input port 101 in the memory bank 304, the control unit 127 reads a divided segment of data from the memory bank 308 and outputs the divided segment of data from the output port 122.

FIG. 5 is the schematic diagram showing packet transfer by the switch 100 according to the embodiment. In FIG. 5, a case where the speed of writing/reading packet data (throughput) in a switch core section of the switch 100 is higher than the speed of transferring packet data in an input and output port section will be described. The switch core section includes the input buffer 107, the shared memory 113, and the output buffer 114. FIG. 5 is the diagram showing a process in which packet data 501 of 8 bytes (B)×156.25 MHz is input from the input port 101 and is output as packet data 504 of 8 bytes (B)×156.25 MHz from the output port 120.

The input buffer 107 stores the packet data 501 with throughput (4 bytes (B)×312.5×Speed-up MHz) higher than throughput (8 bytes (B)×156.25 MHz) with which the packet data 501 is input from the input port 101, as shown in FIG. 5. "Speed-up" represents an improved ratio of the speed of reading/writing operations on the shared memory 113 by the input and output buffers to the speed of reading/writing operations on the input and output buffers by the input and output ports and can be expressed as tp(m)/tp(p) where tp(m) is the speed of reading/writing operations on the shared memory 113 by the input and output buffers, and tp(p) is the speed of reading/writing operations on the input and output buffers by the input and output ports. Thus, input to the input buffer 107 needs to be handled as packet data that includes gaps. This is schematically expressed by a packet 502. A storing operation from the input buffer 107 to the shared memory 113 is performed for each of the blocks that logically constitute the shared memory 113, and a writing operation from the shared memory 113 to the output buffer 114 is performed for each of the blocks. Packet data 503 schematically shows that the control unit 127 transfers packet data in units of blocks including no gap between each of the input buffer 107 and the output buffer 114 and the shared memory 113. That is, it is shown that a gap exists only between blocks. Then, the control unit 127 outputs, from the output buffer, the packet data 504 including no gap with throughput of 8 bytes (B)×156.25 MHz.

FIG. 6 is the schematic diagram concerning storing packet data in a case where gaps occur in the shared memory 113 according to the embodiment. FIG. 6 is the diagram showing the logical structure of the six memory banks 303 to 308 constituting the shared memory 113.

The memory banks 303 to 308 of the shared memory 113 are logically divided into the blocks 201 to 206, as described in FIG. 2. Each of the blocks 201 to 206 includes the words 207 to 212. Each of the words 207 to 212 is a data storage area in the memory banks 303 to 308. That is, each of the blocks 201 to 206 includes data storage areas each of which is a part of the memory banks 303 to 308 that are physically separated. Contiguous memory addresses are assigned across the memory banks 303 to 308.

In FIG. 6, an embodiment in which the switch 100 stores a piece of packet data input from the input port 101 in the memory banks 303 to 308 will be described, as in FIG. 2.

The control unit 127 divides a piece of packet data input from the input port 101 into segments of word size (the size of each of the words 207 to 212). The control unit 127 generates eleven divided segments of data of the word size. Then, the control unit 127 sequentially stores the eleven divided segments of data of the word size in the memory banks 303 to 308. Numbers "0" to "10" described in a matrix represented by blocks (rows) and words (columns) described in FIG. 6 indicate the order in which the control unit 127 stores the eleven divided segments of data in the shared memory 113. The control unit 127 stores the divided segments of data in positions (areas) of the numbers "0" to "10" described in the matrix.

For example, the control unit 127 starts to store one of the divided segments of data from the word 210 in the block 201 and stores ones of the divided segments of data in the words 211, 212, 207, . . . in this order until the control unit 127 finishes storing data in all the words 207 to 212 constituting the block 201. When the control unit 127 finishes storing ones of the divided segments of data in all the words 207 to 212 in the block 201 upon storing one of the divided segments of data in the word 209 in the block 201 (when the control unit 127 finishes storing the divided segment of data indicated by "5"), the control unit 127 stores one of the divided segments of data in the word 212 in the block 203, referring to gap information stored in the TAG memory 126, and then sequentially stores ones of the divided segments of data in the words 207, 208, . . . (in the order of "6", "7", . . . ). Gap information in the embodiment is information that indicates, by, for example, "+2", that the divided segments of data continue to be stored from the word 212. That is, the control unit 127 suspends storing the piece of packet data having been subjected to storing operations in memory banks corresponding to the words 210 and 211, and, for example, stores another piece of packet data. Then, the control unit 127 resumes sequentially storing the divided segments of data from the word 212.

Then, the control unit 127 stores one of the divided segments of data (the divided segment of data indicated as "10") in the word 210 in the block 203 to finish storing the piece of packet data.

In the embodiment, after the control unit 127 stores a portion of packet data input from the input port 101 corresponding to block size in the input buffer 107, the control unit 127 stores the packet data in units of the block size in the memory banks 303 to 308. The reason for this is to prevent a gap from occurring while the control unit 127 is writing divided segments of data to a block.

The TAG memory 126 is a storage unit that stores gap information, as described above. Moreover, the switch 100 may use free space that exists in the shared memory 113 to store gap information in the free space and may store gap information attached to packet data. This arrangement can be readily implemented by setting word size in the shared memory 113 to be larger than word size when packet data is accessed. Moreover, gap information may be a predetermined value or may be dynamically determined by the control unit 127 to be stored in, for example, the TAG memory 126 every time packet data extends across blocks when being stored in the shared memory 113.

[4. Flowchart Concerning Management of Gap Information]

Figure 7:
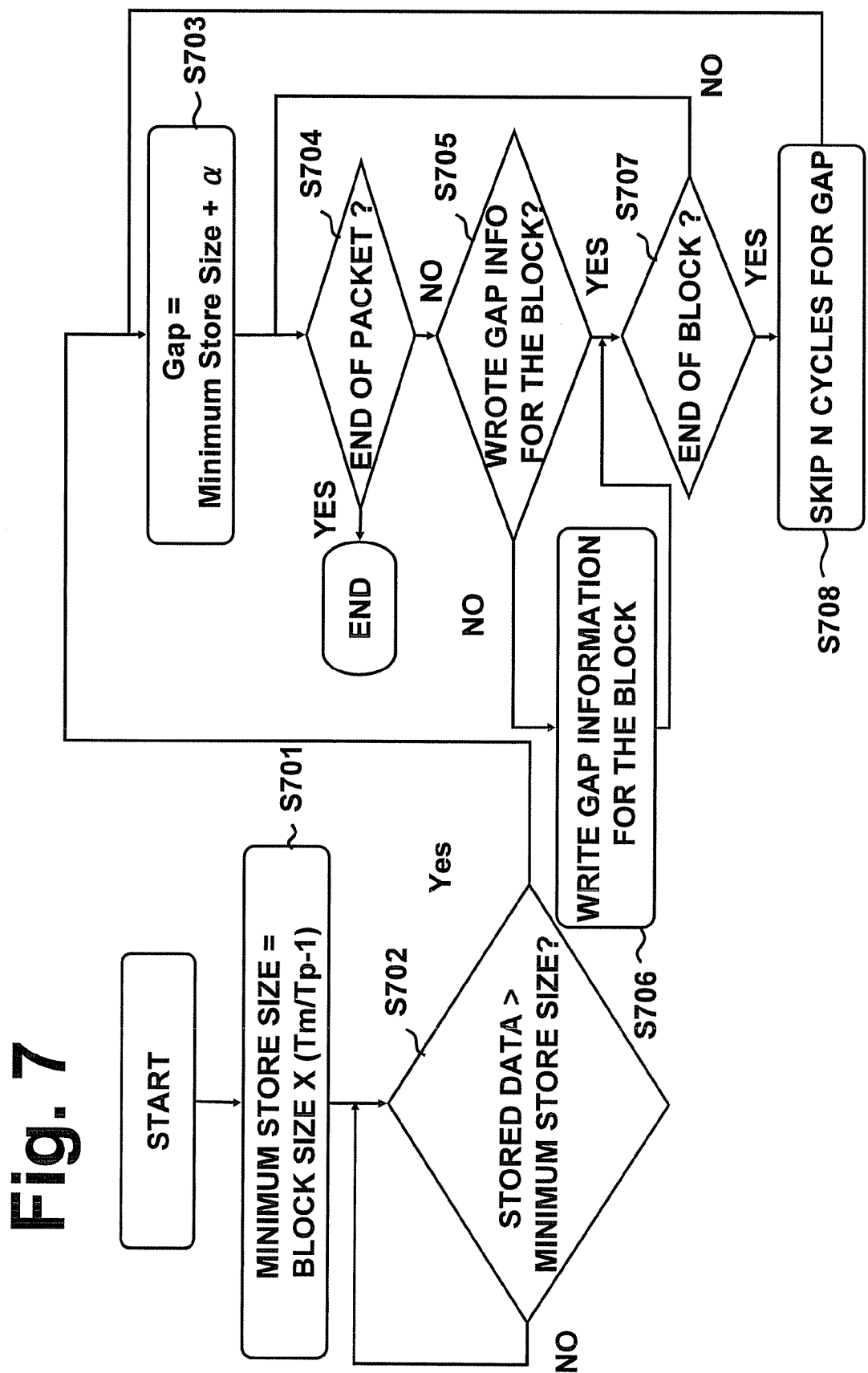
FIG. 7 is a flowchart concerning gap management according to the embodiment when data is stored.

FIG. 7 is a flowchart concerning gap management according to the embodiment when packet data is stored.

The control unit 127 of the switch 100 multiplies the block size of the shared memory 113 by $(1-tp(p)/tp(m))$ (block size×$(1-tp(p)/tp(m))$) to calculate the minimum store size (step S701), where $tp(m)$ is the speed of reading/writing operations on the shared memory 113 by the input and output buffers, and $tp(p)$ is the speed of reading/writing operations on the input and output buffers by the input and output ports. The minimum store size is storage capacity corresponding to a buffer storage amount for absorbing the speed difference between the speed of reading/writing operations on the input and output buffers by the input and output ports and the speed of reading/writing operations on the shared memory 113 by the input and output buffers. Thus, when the size of packet data stored in the input buffer is larger than the minimum store size, the switch 100 can write a block of data to the shared memory without any gap occurring in the block in the shared memory 113.

The control unit 127 determines whether packet data to be stored is larger than the minimum store size so as to determine whether any gap occurs in the shared memory 113 (step S702). When the control unit 127 determines that the packet data to be stored is equal to or less than the minimum store size (step S702 NO), the control unit 127 again determines whether the packet data to be stored is larger than the minimum store size. When data from the outside arrives at the input buffer, step S702 is completed with a limited number of operations. In the embodiment, it is assumed that the minimum size of packet data is larger than the minimum store size. For example, in an embodiment in which Ethernet (registered trademark) is used, the minimum size of packet data is sixty-four bytes. In an embodiment in which the minimum size of packet data is equal to or less than the minimum store size, in step S702, when the end of the packet data has been received, step S702 YES can be selected. Due to the determination, any fragmentary gap does not occur in the packet data.

When the control unit 127 determines that the packet data to be stored is larger than the minimum store size (step S702 YES), the control unit 127 calculates the capacity of gaps that occur in the shared memory 113 (capacity in units of the word size) (step S703). The gap capacity is calculated by determining capacity in units of the word size, the capacity being larger than the minimum store size and closest to the minimum store size. That is, the control unit 127 calculates α value corresponding to capacity in units of the word size as gap capacity (gap information) by adding an amount α to the minimum store size.

Then, the control unit 127 determines whether the end of the packet data to be stored has been reached (step S704). That is, the control unit 127 determines whether a divided segment of data to be stored in the shared memory 113 is one of the divided segments of data constituting the packet data at the last position. When the control unit 127 determines that the divided segment of data to be stored in the shared memory 113 is the last divided segment of data out of the divided segments of data constituting the packet data (step S704 YES), the control unit 127 completes the process of storing the packet data. When the control unit 127 determines that the divided segment of data to be stored in the shared memory 113 is not the last divided segment of data out of the divided segments of data constituting the packet data (step S704 NO), the control unit 127 determines whether the calculated gap information has been stored in the TAG memory 126 (step S705).

When the control unit 127 determines that the gap information has not been stored in the TAG memory 126 (step S705 NO), the control unit 127 stores the gap information in the TAG memory 126 (step S706). When the control unit 127 determines that the gap information has been stored in the TAG memory 126 (step S705 YES), the control unit 127 determines whether the end of a block logically constituting the shared memory 113 has been reached (step S707).

When the control unit 127 determines that the storage position of the divided segment of data in the shared memory 113 is not the end of the block (step S707 NO), the control unit 127 determines whether the divided segment of data is the end of the packet data (step S704). When the control unit 127 determines that the storage position of the divided segment of data in the shared memory 113 is the end of the block (step S707 YES), the control unit 127 skips as many words as the number of words to be skipped indicated by the gap information, referring to the gap information, and stores a divided segment of data in a new block in the shared memory 113 (step S708).

FIG. 8 is a flowchart concerning gap management according to the embodiment when data is read.

When the switch 100 transfers packet data, the control unit 127 reads the packet data from the shared memory 113. The control unit 127 determines whether a read divided segment of data is the last divided segment of data of the packet data to be read (step S801).

When the control unit 127 determines that the read segment of packet data is the last divided segment of data of the packet data to be read (step S801 YES), the control unit 127 completes the process of reading the packet data. When the control unit 127 determines that the read segment of packet data is not the last divided segment of data of the packet data to be read (step S801 NO), the control unit 127 determines whether to refer to gap information stored in the TAG memory 126 (step S802).

When the control unit 127 determines to refer to the gap information in the TAG memory 126 (step S802 YES), the control unit 127 refers, from the TAG memory 126, to the gap information regarding a block in which the read divided segment of data is stored (step S803) and determines whether the read divided segment of data is the end of the block (step S804). When the control unit 127 determines not to refer to the gap information in the TAG memory 126 (step S802 NO), the control unit 127 determines whether the read divided segment of data is the end of the block without referring to the gap information from the TAG memory 126 (step S804).

When the control unit 127 determines that the read divided segment of data is not the end of the block (step S804 NO), the control unit 127 again determines whether a read divided segment of data is the last divided segment of data of the packet data to be read (step S801). When the control unit 127 determines that the read divided segment of data is the end of the block (step S804 YES), the control unit 127 skips as many words as the number of words to be skipped indicated by the gap information and reads a divided segment of data from a new block in the shared memory 113 (step S805). In this case, when the control unit 127 does not refer to the gap information from the TAG memory 126, the control unit 127 obtains information on the number of words to be skipped, referring to gap information attached to a divided segment of data.

The switch 100 according to the embodiment transfers packet data by, although not limited to, the cut through method. The switch 100 may transfer packet data by the store and forward method as another data transfer method. Cut through is a method in which a data packet is instantaneously transmitted from a transmitting side to a receiving port, i.e., when a destination address embedded in a packet has been checked, transmission to the receiving port is started. Moreover, cut through is a method in which determination on discard based on the result of error check of packet data that includes CRC is not performed. Alternatively, the switch 100 may perform packet data transfer by the modified cut through method. The modified cut through method is a method in which, when the first sixty-four bytes of a data packet has been received, transmission to a receiving port is started. The modified cut through method is a packet data transfer method in which loss and collision of packets can be checked. The switch 100 according to the embodiment has one control unit 127 to control to store packet data input to the input ports 101 to 106 in the shared memory 113 via the input buffers 107 to 112. The switch may have a plurality of control units, each control unit controlling to store packet data by a particular group of ports or one control unit controlling to store packet data of input side and another control unit controlling to store packet data of output side.

Moreover, the switch 100 can flexibly manage the difference in speed between a port and a memory by storing information on gaps in a packet attached to leading packet data without decreasing the efficiency of storing operations on the shared memory 113. That is, in the switch 100, high-speed transmission is enabled by shortening the latency without decreasing the efficiency of storing operations on a memory by storing, for each block, information on free space that occurs in the shared memory 113 due to the input and output speed of a port and the writing/reading speed of a memory. It is easy to provide free space enough to store gap information in a shared memory that stores packet data transmitted and received by Ethernet (registered trademark). In an embodiment, word size in a shared memory is set to be larger than word size when a packet is written so as to store gap information in a storage area that occurs due to the difference in word size. Moreover, in an embodiment, gap information is stored, using a word in a block. The switch 100 can manage gap information by the use of the free space, attaching the gap information to packet data.

Moreover, in the switch 100, since the input and output speed of a port and the writing/reading speed of a memory need not match each other, or the writing/reading speed of the memory need not be increased to an integral multiple of the input and output speed of the port, a design change such as installation of an additional port can be flexibly made. That is, for example, when the throughput of a memory per port is increased because additional input and output ports in a switch are installed, the throughput can be increased by just an increment corresponding to the additional ports without decreasing the read throughput storage efficiency of the memory.

Moreover, the switch 100 can implement packet data transfer described above without installing new hardware. Moreover, capacity that needs to be reserved in input and output buffers is the minimum store size (block size×(1−tp(p)/tp (m))), and the switch 100 can implement data transfer in which the latency is short by adopting the cut through method.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A shared memory system comprising:
   a shared memory including a plurality of memory banks for storing data, each of the memory banks including a plurality of divided portions of memory blocks, the memory blocks including a set of divided portions across the memory banks;
   a plurality of input ports for transferring a plurality of streams of data from an exterior of the shared memory system, respectively;
   a plurality of input buffers for receiving the plurality of the streams of data transferred from the plurality of the input ports, respectively; and
   a controller for controlling writing-into and reading out of the shared memory and for transferring data from each of the input buffers to the shared memory,
   said controller writing a series of data received from each of the input buffers into the memory banks around word by word sequentially and cyclically in one of the memory blocks from one of the memory banks designated as a starting memory bank toward the end of the series of data, wherein when selected one of the memory banks for writing one of the words in the series of data is cycled back next to the starting memory bank, another memory block is to be selected next for writing the remainder of the series of data,
   said controller controlling each of the input buffers to transfer a plurality of series of data to the shared memory successively with a time gap while switching to said another memory block, said controller offsetting a start memory bank in said another block for start writing the remainder of the series of data by an amount of memory banks corresponding to the time gap.

2. The shared memory system according to claim 1, further comprising:
   a plurality of output buffers for receiving the plurality of the streams of data transferred from the shared memory; and
   a plurality of output ports for transferring the plurality of streams of data to the exterior of the shared memory system, respectively.

3. The shared memory system according to claim 1, further comprising:
   a memory for storing information indicative of the time gap.

4. The shared memory system according to claim 1, wherein the data has information indicative of the time gap.

* * * * *